(12) United States Patent
Li et al.

(10) Patent No.: US 9,332,318 B2
(45) Date of Patent: May 3, 2016

(54) EXTRA RICH CONTENT METADATA GENERATOR

(71) Applicant: Cisco Technology Inc., San Jose, CA (US)

(72) Inventors: Yuliang Li, Southampton (GB); Chris Mills, Woodley (GB); Ian R. Shelton, Ringwood (GB); Stuart P. Ashby, Woolton Hills (GB); Andrew Valentine, Eastleigh (GB)

(73) Assignee: CISCO TECHNOLOGY INC., San Jose, CA (US)

( * ) Notice: Subject to any disclaimer, the term of this patent is extended or adjusted under 35 U.S.C. 154(b) by 225 days.

(21) Appl. No.: 14/016,418

(22) Filed: Sep. 3, 2013

(65) Prior Publication Data
US 2015/0067737 A1 Mar. 5, 2015

(51) Int. Cl.
*G06F 17/30* (2006.01)
*H04N 21/482* (2011.01)
*H04N 21/2665* (2011.01)
(Continued)

(52) U.S. Cl.
CPC ....... *H04N 21/4828* (2013.01); *H04N 21/2665* (2013.01); *H04N 21/4622* (2013.01); *H04N 21/8405* (2013.01)

(58) Field of Classification Search
USPC .......................... 707/706, 709, 749, 758, 741
See application file for complete search history.

(56) References Cited

U.S. PATENT DOCUMENTS

| 6,735,583 | B1 * | 5/2004 | Bjarnestam ....... G06F 17/30017 |
| 8,079,055 | B2 * | 12/2011 | Hardacker et al. ............ 725/113 |
| 8,705,933 | B2 * | 4/2014 | Eyer ............................. 386/241 |

(Continued)

FOREIGN PATENT DOCUMENTS

| CN | 101378562 A | 3/2009 |
| CN | 101404716 A | 4/2009 |

(Continued)

OTHER PUBLICATIONS

Ji Heng, "Mining Name Translations From Comparable Corpora by Creating Bilingual Information Networks," *Proceedings of the 2nd Workshop on Building and Using Comparable Corpora, ACL-IJCNLP 2009*, pp. 34-37 (Aug. 6, 2009).

(Continued)

*Primary Examiner* — Hanh Thai
(74) *Attorney, Agent, or Firm* — Hahn Loeser & Parks LLP (57) ABSTRACT

In one embodiment, a method includes receiving content metadata related to content items provided by a content provider; retrieving additional metadata from one or more external sources, the additional metadata including language variations of the content metadata; storing the content metadata with the additional metadata in a storage device, wherein the content metadata is stored in association with the additional metadata; receiving a search request from a user, the search request including one or more search terms expressed in a first language variation; identifying, among the content metadata or the additional metadata, relevant metadata matching the one or more search terms; identifying additional relevant metadata stored in association with the relevant metadata, the additional relevant metadata including language variations of the relevant metadata; and adding one or more additional search terms to the search request, the one or more additional search terms corresponding to the additional relevant metadata.

16 Claims, 4 Drawing Sheets

(51) Int. Cl.
*H04N 21/462* (2011.01)
*H04N 21/8405* (2011.01)

(56) References Cited

U.S. PATENT DOCUMENTS

| | | | |
|---|---|---|---|
| 2007/0112839 A1* | 5/2007 | Bjarnestam | G06F 17/30038 |
| 2007/0192300 A1* | 8/2007 | Reuther | G06F 17/30427 |
| 2008/0270462 A1* | 10/2008 | Thomsen | G06F 17/30545 |
| 2010/0257160 A1* | 10/2010 | Cao | G06F 17/30241 707/723 |
| 2012/0136870 A1* | 5/2012 | Joshi | G10L 15/26 707/741 |
| 2013/0212116 A1* | 8/2013 | Filliettaz, III | G06F 17/30923 707/755 |

FOREIGN PATENT DOCUMENTS

| | | |
|---|---|---|
| CN | 102222089 A | 10/2011 |
| CN | 102291615 A | 12/2011 |

OTHER PUBLICATIONS

Kai-Hsiang Yang et al., "Mining Translations of Chinese Names From Web Corpora Using a Query Expansion Technique and Support Vector Machine," 2007 *IEEE/WIC/ACM International conferences on Web Intelligence and Intelligent Agent Technology—Workshops* pp. 530-533 (IEEE 2007).

* cited by examiner

EXTRA RICH CONTENT METADATA GENERATOR

TECHNICAL FIELD

The present disclosure generally relates to methods and apparatus for content metadata generation.

BACKGROUND

With the rapid development of new hybrid networks (which in addition to having a broadcast capability (e.g. terrestrial television (TV), satellite TV, cable TV) also have a broadband internet capability (e.g. digital subscriber line (DSL) or cable)), streaming content becomes more and more popular. An increasing amount of contents including multimedia and audiovisual (AV) content is now available and accessible to users. This amount is only likely to increase further as the traditional broadcasting industry moves into an Over-The-Top (OTT) converged world by developing a new generation of Set-Top Boxes (STB) and companion devices (e.g. computers, mobile telephones, tablet computers, handheld devices, etc.) that are able to stream and playback such content. TV users now expect TV content searches to be as simple, rich and efficient as it is in the Internet world.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

In one embodiment, a method includes receiving content metadata related to content items provided by a content provider; retrieving additional metadata from one or more external sources, the additional metadata including language variations of the content metadata; storing the content metadata with the additional metadata in a storage device, wherein the content metadata is stored in association with the additional metadata; receiving a search request from a user, the search request including one or more search terms expressed in a first language variation; identifying, among the content metadata or the additional metadata, relevant metadata matching the one or more search terms; identifying additional relevant metadata stored in association with the relevant metadata, the additional relevant metadata including language variations of the relevant metadata; and adding one or more additional search terms to the search request, the one or more additional search terms corresponding to the additional relevant metadata.

Example Embodiments

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Although the principles of the present invention are largely described herein in relation to a television broadcast and OTT environment as well as related television applications, this is an example selected for convenience of presentation, and is not limiting.

Similarly, although the principles of the present invention are largely described herein in relation to Chinese language varieties and formats, this is an example selected for convenience of presentation, and is not limiting.

In some countries and/or for certain languages, searching for content (such as TV programs, additional information related to actors/directors, etc.) using traditional remote controls was not easy, not convenient and even sometimes not possible. For example, Chinese character input is difficult using traditional remote controls that typically only support Latin characters. Therefore, content search was not considered as an important business area in these regions in the traditional television broadcasting world. However, the television broadcasting industry is now moving into a multi-screen convergence world with the rise of companion devices (e.g. personal computers, smart phones, tablet computers, etc.) used as new media for content consumption. These companion devices provide new functionalities including new and more convenient searching and language inputting capabilities. Indeed, a user can now search using different types of input e.g. manual entry such as drawing or typing characters (e.g. Chinese simplified and traditional characters), voice entry, etc. Therefore, reliable cross-platform content search support has become an important issue for such countries and/or languages.

Also, TV users now expect content searches to be as simple and efficient as they are in the internet world. Usually, a search engine (software program) is provided that searches the internet to find contents containing one or more specified keywords, and returns a list of search results linking to content in which the keywords are found. Broad-based search engines such as Google (www.google.com) or Yahoo (www.yahoo.com) access a very large numbers of content items (e.g. web pages) using a Web crawler. Another program called an indexer then parses these content items and creates a search index based on metadata for each content item. Each search engine uses a proprietary algorithm to create an index so that, ideally, only meaningful search results are returned for each query. However, due to the complexity and diversity of certain languages, original content metadata may not provide enough information to allow the search engine to return consistent and/or accurate search results. Referring again to the Chinese language example, different types of written Chinese formats exist in different regions. Simplified Chinese is typically used in mainland China whereas traditional Chinese is used in Hong Kong and Taiwan. Furthermore, these different regions may also use different dialects. Indeed, Mandarin is the official language in mainland China (also known as Hanyu Pinyin—referred hereinafter as Pinyin) whereas Cantonese is widely used in Hong Kong or even in southern parts of mainland China (which is a Wade-Giles Romanization—hereinafter referred as Hong Kong Pinyin). Also, Taiwan had its own language pronunciation (Taiwan Tongyong Pinyin—hereinafter referred as Taiwan Pinyin) which differs slightly from the Hanyu and Hong Kong Pinyins. These Pinyin variations are widely used by Chinese users as keyword inputs because they are transcribed in Latin characters and therefore are much more convenient to perform searches (especially with remote controls only supporting Latin character inputs). If, for example, a user searches for contents related to "Jackie Chan" (a well-known actor) and uses its simplified Chinese format (成龙) as keyword, then only the search results containing this specific written format will be returned. Content items indexed with metadata written in another format such as:

Traditional Chinese: "成龍";
Pinyin: "Cheng Long";
Hong Kong Pinyin: "Sing Lung";
Taiwan Pinyin: "Cheng Lung"; or
even in English: "Jackie Chan".

may not be found and therefore not returned to the user as results of the search. User behavior is also a criterion that may be taken into consideration in order to return more accurate and consistent search results. Going further with the example given hereinabove, it is observed that traditional Chinese users heavily use Pinyin shortcuts as keywords for searching. A Pinyin shortcut typically corresponds to the first letter/character of the full Pinyin. Pinyin shortcuts for "Jackie Chan" are given below:

"CL" for mainland (Cheng Long) and Taiwan (Cheng Lung) Pinyins; and
"SL" for Hong Kong Pinyin (Sing Lung).

Therefore, there is need for a system able to take into consideration language variations, users' behaviors and profiles thereby providing more accurate, personalized and relevant search results. For example, a Taiwanese user using "CL" as keyword for searching should be able to receive search results in traditional Chinese format including movies featuring "Jackie Chan" as an actor.

Another challenge relates to geographic and copyright limitations. For an OTT platform, geographic restriction is no longer an issue. In the open internet world, a user (e.g. registered customer) may be physically located anywhere in the world to consume content through OTT. However, in certain regions/areas, access to some content items may be restricted and/or different versions of a same content item may be broadcast due to cultural differences, copyright or other regulatory laws. For instance, a customized version of the "Titanic 3D" movie was specially prepared and broadcast in mainland China—i.e. some scenes were removed—whereas the "Brokeback Mountain" movie was not allowed to be broadcasted. Also, a movie title may be translated into the country language at the time the movie is broadcast. The situation is even more complex in the Chinese example in that a movie title can be translated into a plurality of Chinese titles. To illustrate this, consider the example of the last James Bond movie entitled "Skyfall". In Chinese, "Skyfall" may be translated as:

"大破天幕杀机" in mainland China;
"新鐵金剛：智破天凶城" in Hong Kong (traditional Chinese); and
"空降危機" in Taiwan (traditional Chinese).

Adding the Pinyin variations and shortcuts, "Skyfall" may also be translated as:

"Da Po Tian Mu Sha Ji" in Mainland Pinyin and "TMSJ" as the corresponding shortcut, "Da Po" usually being ignored because it is an adjective;

"Zhi Po Tian Xiong Cheng" and corresponding shortcut "ZPTXC" for Hong Kong Pinyin; and "Kong Jiang Wei Ji" and corresponding shortcut "KJWJ" for Taiwan Pinyin.

Those skilled in the art will appreciate that other non-canonical forms exist such as: "James Bond 2012", or "Bond 23", etc. Therefore, there is a need for a system able to take these limitations into consideration.

The present invention, in embodiments thereof, provides improved methods and related apparatus enabling a user to easily perform content searches and get accurate, personalized and consistent search results while taking into account regional and/or copyright restrictions.

Figure 1:
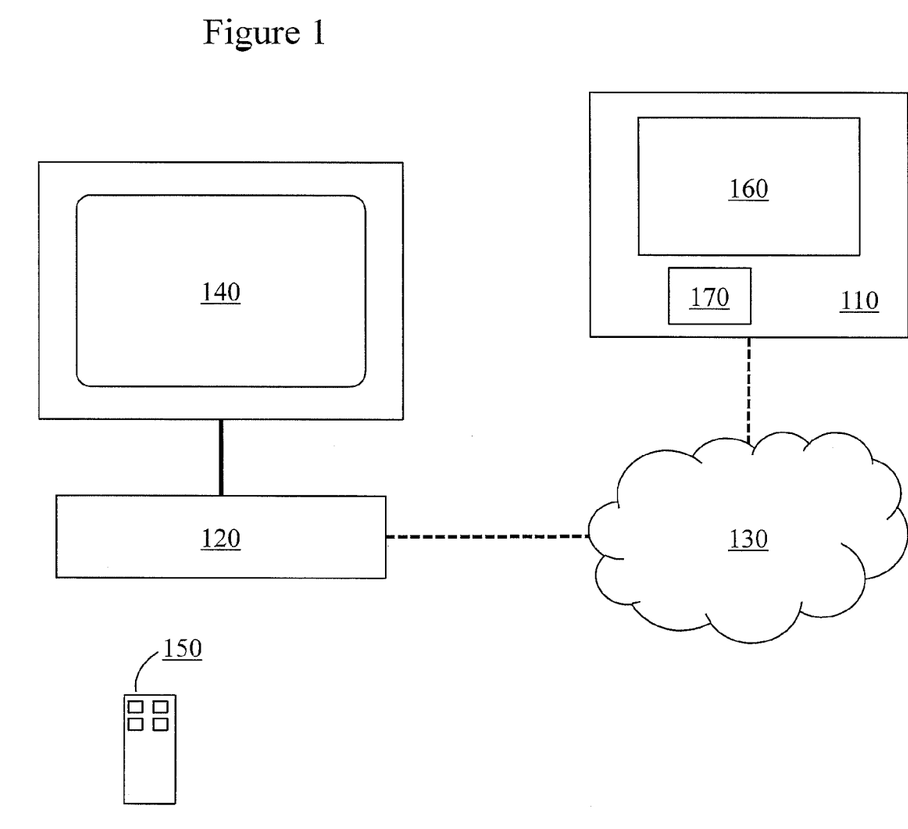
FIG. 1 is a simplified block diagram illustration of a system constructed and operative in accordance with an embodiment of the present invention.

Reference is now made to FIG. 1, which is a simplified block diagram illustration of a system constructed and operative in accordance with an embodiment of the present invention.

A headend 110 typically communicates with a plurality of client devices 120 via a communication network 130. Additionally or alternatively, a plurality of headends 110 communicate with a single client device 120 or with a plurality of client devices 120 via the communication network 130. For simplicity of depiction and description, and without limiting the generality of the invention, only one client device 120 in communication with only one headend 110 is illustrated in FIG. 1.

The communication network 130 includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. It is appreciated that in alternative embodiments, the communication network 130 may, for example, be implemented by a two-way hybrid communication network, such as a combination cable-telephone network, a combination satellite-telephone network, a combination satellite-computer based communication network, or by any other appropriate network. Other ways of implementing the communication network 130 will be apparent to someone skilled in the art.

The client device 120 may be any type of device able to communicate with the headend 110 via the communication network 130. The client device 120 may be for example, but without limiting the generality of the invention, a set-top box (STB), a PVR (Personal Video Recorder), a DVR (Digital Video Recorder), a companion device such as a laptop computer, a desktop or personal computer (PC), a tablet computer such as an iPad™, a mobile computing device, such as a Personal Digital Assistant (PDA), mobile phone, or any suitable handheld device. FIG. 1 shows a client device 120 disposed between a headend 110 and a display device 140. In such a situation, the client device 120 is typically connected in operation to display device 140 via a digital AV interface (e.g. HDMI, DVI, etc.) or via an analogue AV interface (e.g. unit (RGB, YPbPr), composite (NTSC, PAL, SECAM), S-video, SCART, RF coaxial, D-Terminal (D-tanshi) etc.). While shown as separate entities in FIG. 1, the client device 120 may be integral with the display device 140 in other embodiments of the present invention.

Display device 140 is typically operated by a user, for example via a remote control unit (RCU) 150. Those skilled in the art will appreciate that other devices such as PCs, mobile telephones, tablet computers or other suitable handheld devices may be used to operate the display device 140. Depending on the device used, a user can enter search keywords using a variety of methods including, for example, a computer mouse for a computer, keypad buttons for a mobile telephone, or even the user's fingers for devices that support direct manipulation. By using one or more of the various means given as examples hereinabove, a user can search, browse, request, and select AV content to view (such as a live event broadcast, a Video-On-Demand (VOD) asset, a recorded event, etc.) or any suitable information and/or metadata. The operating system software within client device 120 monitors user interaction with display device 140 and/or client device 120.

Furthermore, an extra-rich content metadata generator 160 (ERCMG), typically located on the headend side 110, is operable to communicate with the search engine 170 and the client device 120 via the communication network 130. FIG. 1 shows only one communication network 130. While shown in FIG. 1 as embedded in the headend 110, those skilled in the art will appreciate that in further embodiments of the present invention, the ERCMG 160 may be a separate entity operable to communicate with the headend 110.

Finally, a search engine 170 (shown as a unit of the headend 110) is provided. When a user operates the RCU 150 and selects a menu, enter one or more search terms such as characters and/or numbers or performs an action via an application displayed on the display device 140 (embedded and/or associated with client device 120), a request may be sent via the communication network 130 to the headend 110 and received by the search engine 170. The request may be a request for metadata, TV program or content, or any other additional information. Then, the search engine 170 may pass/forward the request to the ERCMG 160. In response, the ERCMG 160 returns relevant extra-rich metadata to the search engine 170 comprising different language variations of the initial search request and the request is updated by adding this relevant extra-rich metadata to the initial search request. Then, the search engine performs a search using the updated search request and a set of relevant search results are sent back to the client device 120 before being displayed on the display device 140. The ERCMG 160 is also able to adapt the relevance/ranking of the search results by taking into account useful contextual information related to the user such as, for example, but without limiting the generality of the invention, geographic location, initial language input, profile, preferences, search history etc. To do so, weighting rules defining how the search results are to be ranked and displayed are created by the ERCMG 160 using said contextual information and then applied on the search results obtained by the search engine 170.

Figure 2:
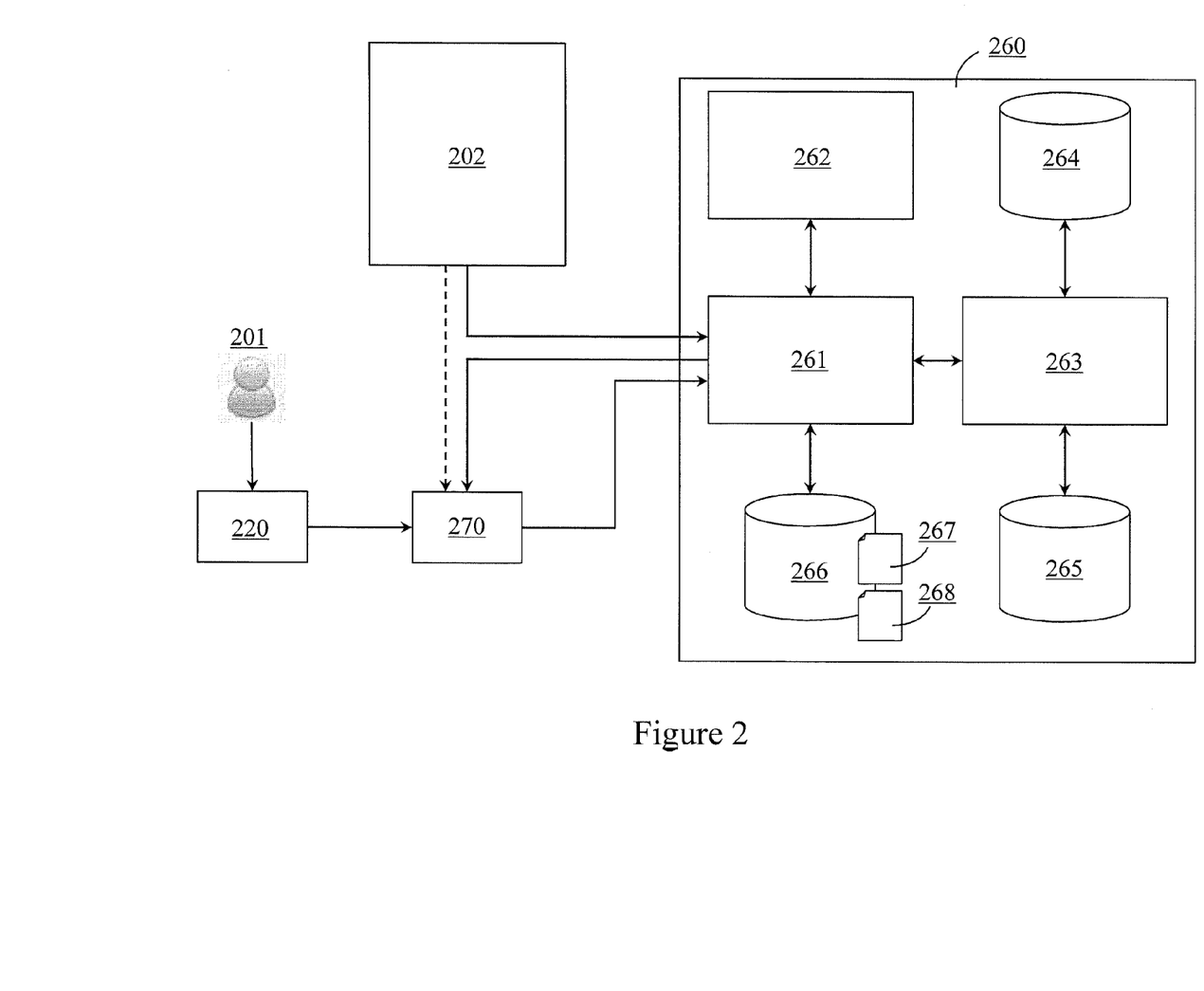
FIG. 2 is a simplified block diagram illustration of a system comprising an extra-rich content metadata generator constructed and operative in accordance with an embodiment of the present invention.

Reference is now made to FIG. 2 which is a simplified block diagram illustration of a system comprising an extra-rich content metadata generator (ERCMG) in accordance with an embodiment of the present invention. The operation of the system of FIG. 2 will be described in detail below in relation to the method of FIG. 3.

Figure 3:
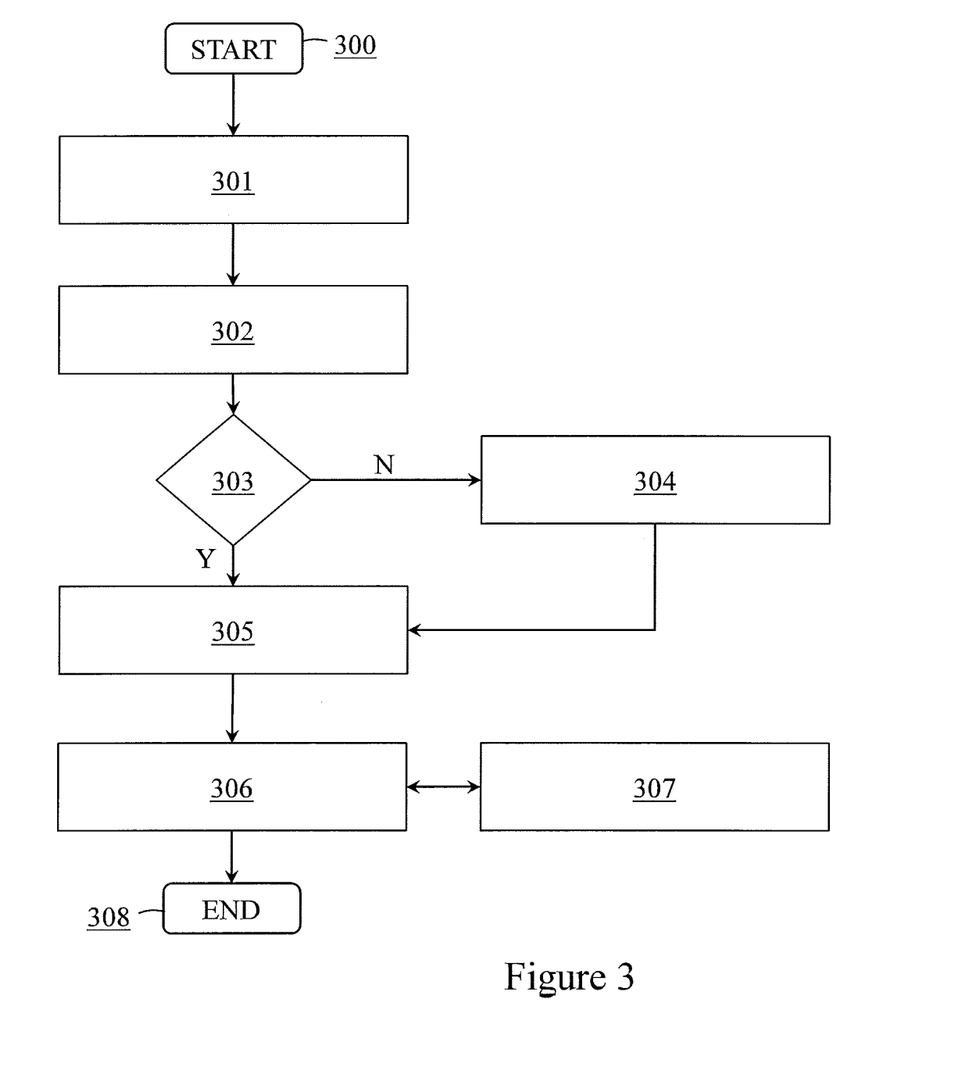
FIG. 3 is a flow chart diagram describing a method of operating an extra-rich content metadata generator according to an embodiment of the present invention.

The process starts at step 300 and at step 301, the content provider 202 (e.g. TV operator) sends content metadata related to content items (e.g. programs forming part of a TV schedule or a VOD catalogue) to the ERCMG 260. Typically, the content metadata may be received and ingested via an Asset Distribution Interface (ADI), an industry guideline that defines how an asset is labeled and categorized using metadata descriptions (e.g. the Cablelabs ADI Specification describes how assets (such as TV programs and commercials) can be distributed from the content source to TV broadcasters), or a linear traffic information interface (e.g. the XML Traffic Interface (XTI), which is a Java based application for importing and exporting XML formatted traffic data to and from a stream database server). Those skilled in the art will appreciate that any other suitable formats for metadata ingestion may be used. Once ingested, the content metadata are stored and indexed in the ERCM database 266 thereby becoming available to users. During or after ingestion, some or all of the ingested content metadata are forwarded to the ERCMG 260 and received by the ERCM manager unit 261. Typically, this content metadata ingestion operation is performed in advance under control of content providers/TV operators during a content preparation stage.

At step 302, the ERCM creating sub-unit 262 checks the content metadata received by the ERCM manager unit 261 and then uses one or more web-crawlers to retrieve additional metadata thereby enriching the original content metadata provided by the content provider. Typically, a web crawler is used to access, parse and extract metadata from external sources such as, but without limiting the generality of the present invention, web portals specified by the content provider. It will be appreciated by those skilled in the art that any other suitable web sources may be accessed as long as a web crawler is able to parse and extract metadata from the web sources. In an embodiment of the present invention, the web crawler(s) are used to search additional metadata related to a subset of the original content metadata. For example, the original content metadata provided by the content provider may include, for each TV or VOD program, one or more pictures, a genre and/or a sub-genre, a title, start and end times, duration, one or more videos, a summary, names of the different actors, a director's name, etc. The web crawler may therefore retrieve additional metadata related to the title or the actors present in the TV or VOD programs. These additional metadata typically include additional names for the actors/director/title, copyright information as well as regional restrictions, etc. corresponding to regional or language variations of the original content metadata.

In the context of the Chinese language and regional variations, the web crawler(s) may access different web portals such as for example, but without limiting the generality of the invention, Mtime (a content metadata web portal for mainland China), Yahoo Movie Hong Kong, or True Movie (for Taiwan) and extract the additional metadata expressed in written Chinese characters. In a situation where the original content metadata included, for instance:

"Jackie Chan" as an actor, the web crawler(s) may be able to retrieve at least one of the following additional metadata corresponding to its regional and/or language variations as well as social common name(s):

"成龙" in simplified Chinese;

"成龍" in traditional Chinese; and/or

"陳港生" as Jackie Chan's Chinese original name.

"Skyfall" as a movie title, the web crawler(s) may be able to retrieve at least one of the following additional metadata corresponding to its regional and/or language variations as well as social common name(s):

"大破天幕杀机" in mainland China;

"新鐵金剛：智破天凶城" in Hong Kong (traditional Chinese);

"空降危機" in Taiwan (traditional Chinese); and/or

"James Bond 2012" or "Bond 23" as social common names.

It will be apparent to those skilled in the art that the original content metadata can be provided in any suitable format and that the web crawler(s) is configured to retrieve the missing additional metadata.

At step 303, a determination is made on whether or not one or more additional metadata were not found by the web crawler(s). If all the additional metadata were successfully retrieved, then the process moves directly to step 305. On the contrary, in situations where one or more additional metadata are missing, the ERCM creating sub-unit 262 may retrieve the missing additional metadata at step 304 by dictionary lookup prior to moving to step 305.

Once retrieved by the web crawler(s), the additional metadata are gathered and may be stored in association with the original content metadata in a plurality of indexes or tables 267-268 of the ERCM database 266. Typically, the original content metadata are associated and stored with their corresponding additional metadata i.e. the additional metadata corresponding to language variations of the original content metadata. Also, the ERCM creating sub-unit 262 may further perform a Pinyin mapping for the original content metadata written in Chinese characters and corresponding additional metadata written in Chinese characters. Therefore, in a situation where the original content metadata and the additional metadata included, for instance: "成龙" in simplified Chinese; "成龍" in traditional Chinese; and "陈港生" as Jackie Chan's Chinese original name, the following Pinyin mapping is performed:

"Cheng Long" in mainland Pinyin;
"Sing Lung" in Hong Kong Pinyin; and/or
"Cheng Lung" in Taiwan Pinyin.

Also, the following Pinyin mapping may be performed for the Skyfall sample:

"Da Po Tian Mu Sha Ji" in mainland Pinyin;

units, databases, etc. may be employed as storage means. The original content metadata and associated additional metadata as well as their Pinyin and Pinyin shortcuts may be stored in a plurality of indexes or tables. FIG. 2 shows two tables 267-268. Table 267 is a metadata table that typically includes mainland Chinese (i.e. simplified Chinese), mainland Hanyu Pinyin and English language variations of same metadata maintained or updated directly by the TV operator. For sake of illustration, Table 1 below shows the metadata table 267 including the metadata variations for the two examples given hereinabove:

TABLE 1

| Metadata table 267 | | |
| --- | --- | --- |
| Mainland Chinese (simplified Chinese) | Mainland Hanyu Pinyin | English |
| 成龙 | Cheng Long | Jackie Chan |
| 大破天幕杀机 | Da Po Tian Mu Sha Ji | Skyfall |

Metadata table 268 is a table that typically includes all the possible regional and/or languages variations as well as social common name(s). For sake of illustration, Table 2 below shows the metadata table 268 including the metadata variations for the two examples given hereinabove:

TABLE 2

| Metadata table 268 | | | | | | | | |
| --- | --- | --- | --- | --- | --- | --- | --- | --- |
| Mainland Chinese (simplified Chinese) | Mainland Hanyu Pinyin shortcut | Hong Kong (traditional Chinese) | Hong Kong Pinyin | Hong Kong Pinyin shortcut | Taiwan (traditional Chinese) | Taiwan Tongyong Pinyin | Taiwan Tongyong Pinyin shortcut | Social common name |
| 成龙 | CL | 成龍 | Sing Lung | SL | 成龍 | Cheng Lung | CL | 陈港生 |
| 大破天幕杀机 | TMSJ | 新鐵金剛：智破天凶城 | Zhi Po Tian Xiong Cheng | ZPTXC | 空降危機 | Kong Jiang Wei Ji | KJWJ | James bond 2012, Bond 23 |

"Zhi Po Tian Xiong Cheng" in Hong Kong Pin; and/or
"Kong Jiang Wei Ji" in Taiwan Pinyin.

At step 306, the ERCM creating sub-unit 262 further creates Pinyin shortcuts. Typically, the first letter of each word from the Pinyin formats is taken to create the Pinyin shortcuts. Therefore, the Pinyin shortcuts are expressed as follow:
for "Jackie Chan":
"CL" for mainland and Taiwan Pinyins; and/or
"SL" for Hong Kong Pinyin.
for "Skyfall":
"TMSJ" for mainland Pinyin;
"ZPTXC" for Hong Kong Pinyin; and/or
"KJWJ" for Taiwan Pinyin.

Once processed, the original content metadata and associated additional metadata, Pinyin and Pinyin shortcuts are further stored in association in the storage unit 266—hereinafter referred as the ERCM database 266—(step 307) under the control of the ERCM manager unit 261. Although only one ERCM storage unit 266 is shown in FIG. 2, those skilled in the art will appreciate that a single or a plurality of storage Those skilled in the art will appreciate that the metadata that can be indexed are not restricted to what is shown in Table 2. Indeed, further language or regional variations as well as other social common names are encompassed by the present invention and therefore may be included as entries into Table 2. Furthermore, those skilled in the art will appreciate that although stored in two separate tables, the extra-rich metadata may be stored in a single or a plurality of tables. The process ends at step 308 when the extra-rich metadata comprising the original content metadata, their associated additional metadata, the Pinyin and the Pinyin shortcuts, are indexed and stored in ERCM database 266.

When a user 201 operates the remote control 150, he can initiate a search request by entering one or more search terms such as characters, numbers or keywords in any type of written language variations e.g. traditional written formats such as Latin characters or simplified/traditional Chinese characters; pronunciation formats such as mainland China, Hong Kong or Taiwan Pinyins; or even Pinyin shortcuts. A request may then be sent by the client device 220 to the search engine

270. The request may be a request for content, metadata, or any other additional information. The search engine 270 typically passes/forwards the search terms of the search request expressed in a first language variation to the ERCM manager unit 261 of the ERCMG 260. The ERCM manager unit 261 searches ERCM database 266 and tables 267-268 to identify relevant metadata among the extra-rich metadata that match the first language variation of the search terms entered by the user 201. As explained hereinabove, tables 267-268 comprise a plurality of different language variations of a same metadata. Therefore, upon identification of the relevant metadata in tables 267-268 matching the search terms entered by the user in the first language variation, the ERCM manager unit 261 is able to identify additional relevant metadata corresponding to different language variations of the identified relevant metadata. Finally, the ERCM 260 returns the additional relevant metadata to the search engine 270 and the initial search request is updated by adding additional search terms (corresponding to the additional relevant metadata) to the initial one or more search terms entered by the user in a first language variation. By providing additional relevant metadata to the search engine 270, the search is not restricted to the exact user's initial input. To illustrate this, consider the example of a user 201 who enters "成龙" ("Jackie Chan" in simplified Chinese) as a keyword into the search engine 270. Without the ERCMG 260, the search engine 270 may return to the user 201 only the search results matching exactly this particular written format. With the ERCMG 260, the search engine 270 is typically able to identify this particular written format in the ERCM database 266 and retrieve:

the mainland Pinyin "Cheng Long" as well as the English name formats from the metadata table 267; and the Hong Kong ("成龍", "Sing Lung" and "SL") and the Taiwan "成龍" and "Cheng Lung" and "CL") language variations as well as the mainland Chinese Pinyin shortcut "CL" and the social common name "陈港生" from the metadata table 268.

The ERCMG 260 also includes an ERCM weighting sub-unit 263 associated with two databases: a user searching history database 264 and a user profile database 265. In an embodiment of the present invention, the ERCM weighting sub-unit 263 is able to adapt the relevance and ranking of the search results by taking into account useful contextual information related to the user 201 such as, for example, but without limiting the generality of the invention, geographic location, initial language input, user profile, preferences, searching history, etc.

Figure 4:
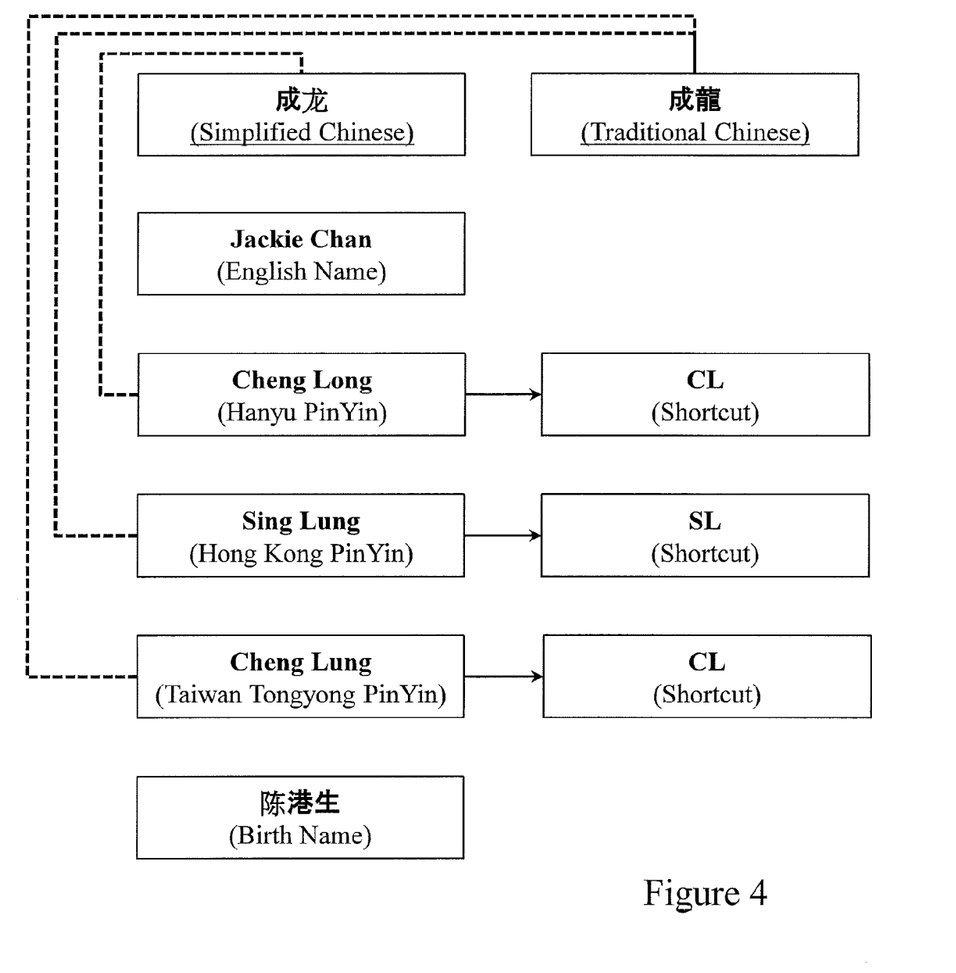
FIG. 4 is a block diagram illustration of the relationships between different metadata related to a particular actor in accordance with an embodiment of the present invention.

The operation of the ERCM weighting sub-unit 263 will be described below in relation to FIG. 4, which is a block diagram illustration of the relationships between different metadata related to a particular actor in accordance with an embodiment of the present invention. Typically, when a user 201 initiates a search request, the search engine 270 receives and forwards it to the ERCMG 260. The request is received by the ERCM manager unit 261. The initial input entered by the user 201 is typically to the ERCM weighting sub-unit 263. Furthermore, in a situation where the initial input is not recognized by the ERCMG 260 or is not found in the database 266, the initial input is sent to the ERCM creating sub-unit 262 for further processing. This processing is similar to the one described for the ingestion procedure and the input is treated as a content metadata received from the content provider 202. In such a situation, the initial input may be processed as described in the method shown on FIG. 3. Upon reception of initial input, the ERCM weighting sub-unit 263 analyzes the input to determine which regional and/or language variation or Pinyin format is used. The ERCM weighting sub-unit 263 may be able to detect, at this point, if the input is in simplified or traditional Chinese or if the input corresponds to a specific Pinyin format. Also, the ERCM weighting sub-unit 263 is able to interpret shortcuts used by the user 201 to perform a search. Based on the results of the analysis, the ERCM weighting sub-unit 263 may provide weighting rules to the search engine 270 to be applied at the time when the search results have to be displayed. To illustrate this, consider the example given in FIG. 4. If a user 201 enters "成龙" in the search engine 270 to get information related to "Jackie Chan", the ERCM weighting sub-unit 263 typically detects that the input is provided as simplified Chinese. Therefore, the ERCM weighting sub-unit 263 may send specific weighting rules to the search engine 270 to influence the ranking of the search results. For example, it may give more importance to the search results written in simplified Chinese, or comprising this written form of the actor's name and/or comprising the mainland Pinyin actor's name by displaying them on the screen as the first search results and/or with a particular visual indication, etc. Those skilled in the art will appreciate that any suitable display forms or indications may be used to specifically characterize the weighted search results. Similarly, if a user 201 enters "成龍" in the search engine 270 to get information related to "Jackie Chan", the ERCM weighting sub-unit 263 typically detects that the input is provided as traditional Chinese and may send specific weighting rules giving more importance to the search results written in traditional Chinese or comprising this written form and/or the Pinyin form of the actor's name.

In another embodiment of the present invention, further analyses are performed in order to refine the weighting rules. To do so, the ERCM weighting sub-unit 263 may retrieve further information from the user searching history 264 and the user profile 265 databases. Typically, the user searching history database 264 includes information related to previous searches requested by the user 201 and/or performed by the search engine 270. Also, the user profile database 265 includes information related to the different users of the system and may include user's preferences, geographic location (e.g. registered household location, current position, etc.), different profiles for a particular household, device, subscription, etc. This additional information may be used to provide the search engine 270 with refined weighting rules to be applied at the time when the search results are returned to the user 201. Furthermore, in the example of FIG. 4, if the user 201 inputs "CL" in the search engine 270 to get information related to "Jackie Chan", the ERCM weighting sub-unit 263 typically detects that the request relates to "Cheng Long" (mainland Hanyu Pinyin) and/or "Cheng Lung" (Taiwan Tongyong Pinyin). In such a situation, even if some weighting rules can be applied and sent to the search engine 270 at this time, it may be useful to get more information about the user 201. The ERCM weighting sub-unit 263 may retrieve contextual information related to the user 201 such as, for example but without limiting the scope of the invention, his geographic location and/or that the user 201 also used simplified Chinese for previous searches. Therefore, a higher weighting may be given to the search results provided in simplified Chinese or comprising the written and/or mainland Hanyu Pinyin forms of the actor's name. Those skilled in the art will appreciate that any type of contextual information related to the user 201 stored in databases 264 and 265 may be used in order to refine the weighting rules.

In a further embodiment of the present invention, the ERCM weighting sub-unit 263 is able to customize the search results by further taking into consideration regional copyright and content distribution regulations. As explained hereinabove, in certain regions/areas, access to some content items may be restricted and/or a different version may be broadcast due to cultural differences, copyright or other regulatory laws. For instance, a customized version of the "Titanic 3D" movie was specially prepared and broadcast in mainland China—i.e. some scenes were removed—whereas the "Brokeback Mountain" movie was not allowed to be broadcast. Also, a movie title may be translated into the country language at the time it is broadcast. The customization of the search results may include removing some search results so that the user 201 may not access the content; and/or replacing some search results; and/or adding some specific weighting rules for some contents. To do so, the ERCM weighting sub-unit 263 checks the current user's geographic location and the regional copyright and content distribution regulations. Typically, GPS (Global Positioning Satellite) data is used to establish the current user's geographic location. Those skilled in the art will appreciate that any other suitable means for retrieving a current geographic position may be used. As a result, a Taiwanese user 201 searching for the "Titanic" movie may receive, for example, different search results depending on his geographic location. If he is currently located in Taiwan, he may receive the Taiwanese version of the movie as one of the search results whereas this version may be simply removed and/or replaced by the Chinese version if he is in mainland China. Also, in the latter case, the Taiwanese user 201 may receive the Chinese version of the "Titanic" movie along with user friendly traditional Chinese metadata although all the other Chinese versions of the "Titanic" movie were provided in simplified Chinese.

Although the principles of the present invention are largely described herein in relation to a television broadcast environment and related television applications, this is an example selected for convenience of presentation, and is not limiting.

Similarly, although the principles of the present invention are largely described herein in relation to Chinese language varieties and formats, this is an example selected for convenience of presentation, and is not limiting.

Although the above embodiments have been described as being carried out on the headend side, someone skilled in the art will appreciate that various features of the invention may be implemented in intermediate network units and/or on the client device side.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited to what has been particularly shown and described hereinabove. Rather the scope of the invention is defined by the appended claims and equivalents thereof.

The invention claimed is:

1. A method implemented on a content metadata generator, said method comprising:
   receiving, at a content metadata generator manager unit, content provider metadata related to content items provided by a content provider;
   retrieving additional external metadata for a subset of said content provider metadata related to said content items, said additional external metadata comprising language variations of said content provider metadata retrieved from one or more external sources using one or more web crawlers, said language variations comprising at least one of: a written format; a pronunciation format; and a social common name;
   storing said content provider metadata with said additional external metadata in a storage device, wherein said content provider metadata is stored and indexed in association with said additional external metadata;
   receiving, at a search engine, a content item search request from a user, said content item search request comprising one or more search terms expressed in a first language variation;
   identifying, using said index, relevant metadata matching said one or more search terms among said content provider metadata or said additional external metadata stored and indexed in association in said storage device;
   identifying additional relevant metadata stored and indexed in association with said relevant metadata in said storage device, said additional relevant metadata comprising language variations of said relevant metadata and corresponding to content provider metadata and/or additional external metadata other than said relevant metadata matching said one or more search terms; and
   adding one or more additional search terms to said content item search request, said one or more additional search terms corresponding to said additional relevant metadata.

2. The method of claim 1, wherein said retrieving additional external metadata from one or more external sources comprises:
   crawling and parsing one or more web sources, wherein said one or more web sources comprise one or more web portals providing additional external metadata in different language variations; and
   extracting said additional external metadata from each of said crawled and parsed one or more web sources.

3. The method of claim 1, wherein said subset of said content provider metadata comprises at least one of the following:
   an actor name;
   a director name;
   a title; and
   a copyright and/or regional information.

4. The method of claim 1, wherein said written format comprises simplified and/or traditional Chinese.

5. The method of claim 1, wherein said pronunciation format comprises Hong Kong, Taiwan Tongyong and/or Hanyu Pinyins.

6. The method of claim 1, wherein a further language variation is created corresponding to shortcuts of said pronunciation format.

7. The method of claim 6, wherein said shortcuts are created by taking a first letter of each word for each of said additional external metadata in pronunciation formats.

8. The method of claim 6, wherein said content item search request comprising one or more search terms expressed in a first language variation is a shortcut of a pronunciation format.

9. The method of claim 1, said method further comprising:
   creating weighting rules defining how search results are to be ranked and displayed; and
   applying said weighting rules to search results obtained using said content item search request comprising said one or more search terms and said one or more additional search terms.

10. The method of claim 9, wherein said weighting rules defining how search results are to be ranked and displayed comprises ranking search results in a language variation corresponding to said first language variation higher than other search results.

11. The method of claim 9, wherein said weighting rules defining how search results are to be ranked and displayed comprises ranking search results in a language variation most frequently used by said user for previous searches higher than other search results.

12. The method of claim 9, wherein said weighting rules defining how search results are to be ranked and displayed comprises ranking search results in a language variation defined in said user's profile higher than other search results.

13. The method of claim 9, wherein said weighting rules defining how search results are to be ranked and displayed comprises ranking search results in a language variation corresponding to said user current location higher than other search results.

14. The method of claim 9, wherein said weighting rules defining how search results are to be ranked and displayed comprises removing some search results in a language variation according to said user current geographic location and local copyright restrictions.

15. The method of claim 9, wherein said weighting rules defining how search results are to be ranked and displayed comprises replacing some search results in a language variation according to said user current geographic location and local copyright restrictions.

16. One or more computer readable tangible storage media encoded with software comprising computer executable instructions and when the software is executed operable to:
    receive, at a content metadata generator manager unit, content provider metadata related to content items provided by a content provider;
    retrieve additional external metadata from one or more external sources for a subset of said content provider metadata related to said content items, said additional external metadata comprising language variations of said content provider metadata retrieved from one or more external sources using one or more web crawlers, said language variations comprising at least one of: a written format; a pronunciation format; and a social common name;
    store said content provider metadata with said additional external metadata in a storage device, wherein said content provider metadata is stored and indexed in association with said additional external metadata;
    receive, at a search engine, a content item search request from a user, said content item search request comprising one or more search terms expressed in a first language variation;
    identify, using said index, relevant metadata matching said one or more search terms among said content provider metadata or said additional external metadata stored and indexed in association in said storage device;
    identify additional relevant metadata stored and indexed in association with said relevant metadata in a storage device, said additional relevant metadata comprising language variations of said relevant metadata and corresponding to content provider metadata and/or additional external metadata other than said relevant metadata matching said one or more search terms; and
    add one or more additional search terms to said content item search request, said one or more additional search terms corresponding to said additional relevant metadata.

* * * * *